United States Patent [19]

Jansson et al.

[11] Patent Number: 5,540,529
[45] Date of Patent: Jul. 30, 1996

[54] LOCKING MEMBER

[75] Inventors: Börje Jansson; Stefan Jansson, both of Kolsva, Sweden

[73] Assignee: Ina Walzlager Schaeffler KG, Herzogenaurach, Germany

[21] Appl. No.: 204,413

[22] PCT Filed: Sep. 28, 1992

[86] PCT No.: PCT/SE92/00678

§ 371 Date: Mar. 15, 1994

§ 102(e) Date: Mar. 15, 1994

[87] PCT Pub. No.: WO93/07396

PCT Pub. Date: Apr. 15, 1993

[30] Foreign Application Priority Data

Oct. 2, 1991 [SE] Sweden .................... 9102859

[51] Int. Cl.⁶ .................................... F16B 39/22
[52] U.S. Cl. ........................... 411/291; 403/370
[58] Field of Search ................... 411/290, 291, 411/432, 937.2, 937, 936; 403/370, 368, 367

[56] References Cited

U.S. PATENT DOCUMENTS

| | | | |
|---|---|---|---|
| 171,898 | 1/1876 | Wiles | 411/291 X |
| 2,409,204 | 10/1946 | Gall | 411/291 X |
| 3,168,228 | 2/1965 | Lewis . | |
| 3,443,432 | 10/1969 | Joy | 411/937.2 X |
| 3,664,692 | 5/1972 | Spieth | 403/370 |
| 4,043,692 | 8/1977 | Hund | 403/370 X |
| 4,452,547 | 6/1984 | Thiel et al. | 403/370 |
| 4,557,652 | 12/1985 | Lundgren | 411/936 X |
| 4,622,730 | 11/1986 | Steinbock | 411/432 X |

FOREIGN PATENT DOCUMENTS

| | | |
|---|---|---|
| 668722 | 11/1929 | France . |
| 2407385 | 5/1979 | France . |
| 2228062 | 12/1973 | Germany . |
| 431011 | 2/1983 | Sweden . |
| 1375873 | 2/1988 | U.S.S.R. . |
| 1296887 | 11/1972 | United Kingdom . |
| 1392182 | 4/1975 | United Kingdom . |
| 2134615 | 8/1984 | United Kingdom . |
| 2177178 | 1/1987 | United Kingdom . |
| 2221506 | 2/1990 | United Kingdom . |

OTHER PUBLICATIONS

Derwent's abstract, No. 88–262 545/37, SU 1 375 873, publ. week 8837, 1 page.

Primary Examiner—Jerry Redman
Attorney, Agent, or Firm—Young & Thompson

[57] ABSTRACT

A locking member being provided with a parallel to a side face running primary recess within an internal or external rim surface. This primary recess is dividing the member into a solid supporting portion and a first portion having a side face provided with a locking member, the depth of the recess being such that the member formes one integrated single piece. The side face of the first portion is divided by secondary cuts carried through a central point of symmetry forming a number of sectors corresponding to the number of desired locking members, the secondary cuts at the same time constituting gripping surfaces for tools for the manipulation and use of the member. The locking member also provides internal or external locking to an internal or external threaded but also non-threaded surfaces.

15 Claims, 3 Drawing Sheets

LOCKING MEMBER

The present invention relates to an internal or external locking member and more exactly a locking member or a locking nut for an internal or external threaded or non-threaded surface.

PRIOR ART

Within mechanical engineering there is a great demand of locking members in the form of locking nuts. Locking nuts are normally available in two different applications, partly in a so called self-locking application and partly in an application having a mechanically influenced device to lock the nut in a certain fixed position. A self-locking nut may normally be used one time only, while the other type of nut is intended to be used a number of times still having adequate locking capacity.

Prior art presents numerous locking elements of the latter type. In GB-A-2 221 506 is disclosed a lockable threaded member for axial adjustment. The member presents radial slots dividing the member into thick and thin cantilevered portions. The thin cantilevered portions, generally of a number of two, may each axially be displaced relative to the thick portion by means of a pulling screw. A disadvantage with this type of locking is that when releasing a locked member, the member must be knocked free to cause the thin cantilevered portions to return to neutral positions after the screw is released. As in the demonstrated embodiment this member demands a special pinned tool for each dimension of such a locknut to be able to convey it an or off a thread. Furthermore the design also implies that the number of locking means will be limited.

In a Swedish document SE 431 011 is disclosed another variant of a lockable nut comprising two annular portions connected by preferably elastic means. Locking occurs by tightening of a screw arranged i one of the portions of the nut and resting against the other portion of the nut. The design has the known disadvantage that it generally will tilt somewhat on the thread due to that the principle of locking is based on a tilt of one portion in relation to the other portion. Additionally the manufacturing is unnecessary complicated due to that, except the locking screw itself, the locking nut comprises a number of separate different elements. Also here is generally needed a special tool for each dimension of the nut to tighten the nut and dependent of if the nut is provided with a female or male thread.

In a German document DE-2 228 062 from 1972 is additionally disclosed a locknut having a wedge-shaped cut permitting the nut to be clamped by means of a screw. This nut then also suffers from the same disadvantage of not locking flat with the thread by becoming unsymmetrical in the axial direction from the way it is being clamped upon locking. Furthermore such a nut may be hard to release as it simply may damage the threads by being deformed upon locking. An almost identical solution having the same disadvantage is also disclosed in the document FR 668 722 dated Jul. 22, 1929.

In GB-1 392 182 is also disclosed a design having a rigid collar and a member having a cylindrical passage for a shaft, whereby it is provided with means for tilting of the rigid collar relative to the member at a position to get a misalignment between the collar and the member to achieve a locking operation.

Additionally in GB-A-2 177 178 is disclosed an adjustable locknut being adjusted by a radially inserted locking screw. The drawback of this design is that it is only applicable where a peripheral access of the nut always is possible. The design furthermore is only applicable for a locking against a male thread.

A British document GB-1 296 887 and a French document FR-2 407 385 discloses a locknut for internal respective external locking. Both designs rely on a partly conical shape of a part the threaded portion of the element, which has a drawback that these nuts show a large friction when used and will consequently wear the thread of the corresponding element where the locking is performed.

Finally from U.S. Pat. No. 3,168,228 is known a device to render a clamping action by means of a number of bolts clamping a member which then expands in radial direction. However, this design is merely thought to be used as a locking seal and has limitations for a general locking operation as this design demands that locking takes place against two opposite cooperating faces.

Still there is a need and a desire for an internal or external locking means for an internal or external threaded or non-threaded surface. The demand is that the means should be simple and economical to manufacture and at the same time offer repeated use and offer a locking positioning the locking means absolutely perpendicular to the longitudinal direction of the threaded or non-threaded surface.

DESCRIPTION OF THE INVENTION

Therefore there is an object according to the present invention to provide a locking member comprising a primary recess running in an inner or an outer rim surface, the recess in the inner or outer rim surface dividing the member into a fixed second supporting portion and a first portion containing locking means, which due to a symmetric arrangement do position the locking member with no tilt, perpendicular to the longitudinal direction of the surface against which the locking is to be made.

Another object of the invention is to provide a member for internal or external locking against a structural shape of a general configuration, where the locking surface is continuous, but slightly articulated by the division of the side face into sectors provided with locking means.

Additionally there is an object of the present invention to provide a locking member offering locking both against a round female thread as well as a non-threaded surface.

Furthermore there is an object of the present invention to provide a locking member offering locking both against a round male thread as a non-threaded surface.

Another additional object of the present invention is to provide a locking member which due to its basic design also offers simple defined gripping surfaces for the manipulation of the locking member by a tool.

Furthermore there is another object of the present invention to provide a locking member being simple and economical to manufacture and demanding a less number of tools to manipulate different dimensions of the locking member, the gripping surfaces obtained due to the basic design facilitating that the same simple tool may be used independent if the clamping is intended to be made internal or external and also within defined dimension ranges having different sizes of locking members.

There is another additional object of the present invention to provide a locking member simply replacing a locknut, but having very distinct locking capabilities in positioning the locknut absolutely perpendicular to the longitudinal direction of the threaded or non-threaded surface, the locking member if desired being provided with, for example, an outer hexagon to equivalently replace an ordinary locknut.

DESCRIPTION OF THE DRAWINGS

The present invention will be described in a number of preferred embodiments by means of the attached drawings where corresponding parts are given the same reference numbers and in which.

PREFERRED EMBODIMENTS

Figure 1:
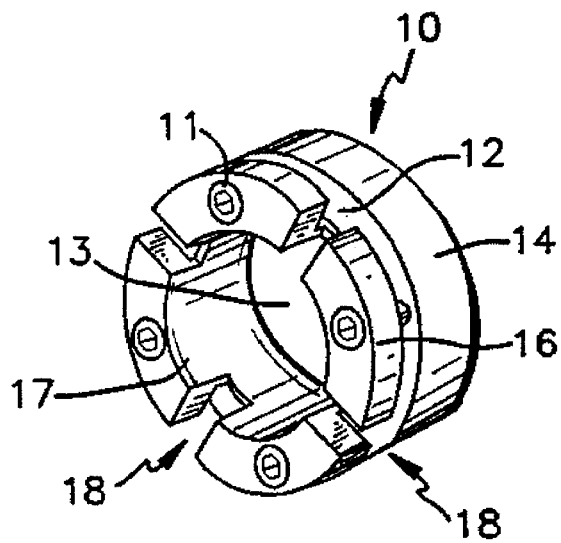
FIG. 1 is a perspective view of a preferred embodiment of a locking member for external clamping according to the present invention.

In FIG. 1 is demonstrated a preferred embodiment of a locking member according to the present invention. The locking member consists of a body 10 defined by an outer rim surface and having a first and a second side face with a through hole 13 defining an inner rim surface. The through hole in the preferred embodiment is shown as a round hole but may in principle take any form for a non-threaded locking member. Furthermore, the member 10 is provided with a primary recess 12 dividing the outer rim surface into two continuous portions 14 and 16, respectively. The primary recess 12 has a depth which at all positions is less than the distance between the inner and outer rim surfaces. The portion 14 then constitutes a second supporting portion with the second side face, while the first portion 16 is having the first side face and is divided at this first side face by one or more secondary cuts 18 perpendicular to the first side face. In the preferred embodiment of FIG. 1 is demonstrated two crossing secondary cuts 18 dividing the first side face into four sectors 17. In each of the sectors there is a through hole housing a locking means 11 in the form of a bolt, while in another embodiment such a sector preferably contains several locking means for larger dimensions of the locking member. The secondary cuts have a depth such that those extend into about half the width of the primary recess 12, such that a sector is formed, whereby the locking means in each sector is utilizing a lever effect.

Figure 2:
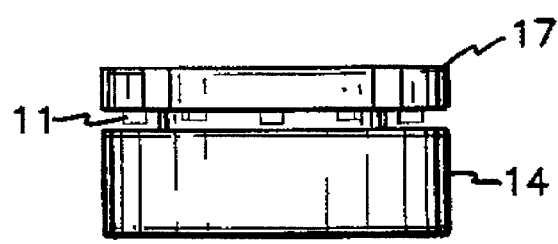
FIG. 2 is side elevation view of the locking member in FIG. 1.
Figure 3:
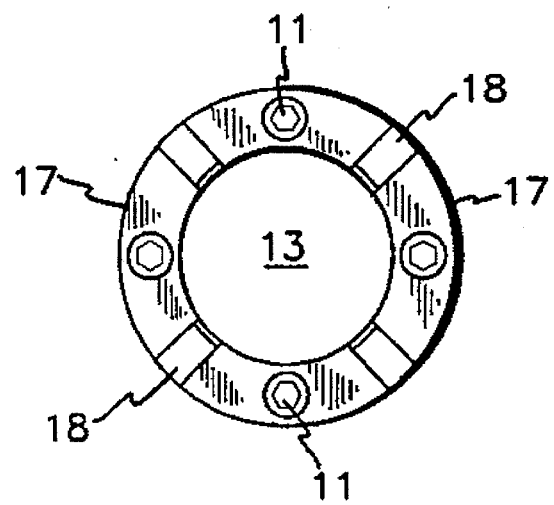
FIG. 3 is a horizontal top view of the locking member in FIG. 1.

From FIG. 2 may be seen, being a side elevation view of the member 10 of FIG. 1, that the bolts being threaded in the first portion may be tightened such that these will rest against an inner surface of the recess 12, which consequently if the bolt is further tightened, in a direction away from the supporting portion 14, will displace the sector portion 17 having the locking bolt. In FIG. 3 is illustrated the locking member in a horizontal top view showing the symmetric positioning of the secondary cuts and the bolts 11 constituting the locking means. Furthermore is demonstrated that the depth of primary recess leaves a connecting portion of the order of a tenth of the distance between the outer and inner rim surface.

Although not necessary, where appropriate the through hole 13 may be provided with a female thread to facilitate attaching member 10 to a suitable structural shape such as a round, flat or a threaded bar. Due to the symmetric positioning of the locking means 11 the member may be clamped precisely aligned onto the bar. If both the bar and the member are provided with corresponding threads the locking will not involve any destruction of the threads and the member may be repeatedly locked onto and released from the bar. By the design of the sectors the member immediately releases from the bar and may easily be turned when the pressure of the locking means is decreased. The member will lock already at a slight tightening of only one locking means due to that the locking surface being continuous, whereupon by crosswise tightening of the locking means the locking member will without tilt precisely be positioned on the bar independent if it applies to a threaded or non-threaded clamping. This tightening is made where appropriate by means of a dynamometric wrench.

Figure 4:
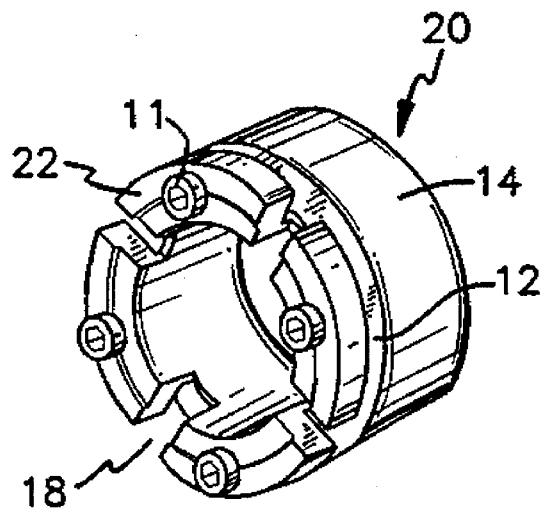
FIG. 4 is a perspective view of a preferred embodiment of a locking member for internal clamping according to the present invention.
Figure 5:
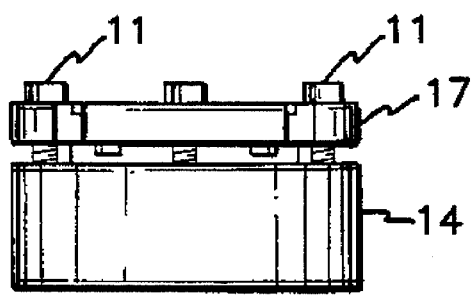
FIG. 5 is a side elevation view of the locking member in FIG. 4.
Figure 6:
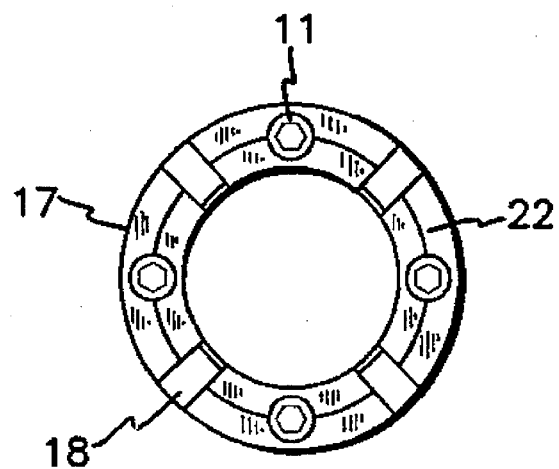
FIG. 6 is a horizontal top view of the locking member in FIG. 4.

In FIGS. 4 to 6 is demonstrated a corresponding preferred embodiment for internal locking. The member 20 presents a corresponding recess 12 and corresponding secondary cuts 18 forming four sectors 17 each having an own locking means 11. Here the sectors 17 are arranged having a small raised collar 22 along the outer rim toward which the head of the locking bolt 11 constituting the locking means will rest.

In FIG. 5 may be seen different from FIG. 2 that the bolts 11 are longer and are threaded into the supporting portion 14, whereby in this case the locking means in the form of bolts will get a pulling effect, and the force of which will be enhanced by the raised collar such that the sectors will strive to move towards the supporting portion upon tightening of the bolts 11. In FIG. 6 the locking member is shown in a horizontal top view demonstrating the symmetric positioning of the secondary cuts and the raised collar 22 and the bolts 11 constituting the locking means. Furthermore is seen that the depth of the primary recess 12 leaves a continuous portion of the order of a tenth of the distance between the outer and inner rim surface.

Where appropriate the outer rim surface is provided with a male thread, which anyway is not necessary for the member 20 to be locked against a suitable hollow structural shape, for example in the case of the preferred embodiment a round, flat or internally threaded, suitable hollow tube. Due to the symmetric positioning of the locking means 11 the member may be locked precisely aligned within the hollow tube. If both the hollow tube and the member are provided with corresponding threads the locking will not involve any destruction of the threads and the member may be repeatedly locked into and released from the hollow tube. By the design of the sectors the member immediately releases from the hollow tube and may easily be turned when the pressure of the locking means is decreased. The member will lock already at a slight tightening of only one locking means, whereupon by crosswise tightening of the locking means the locking member will without tilt precisely be positioned within the hollow tube independent if it applies to a threaded or non-threaded clamping. This tightening is made where appropriate by means of a dynamometric wrench.

Figure 7:
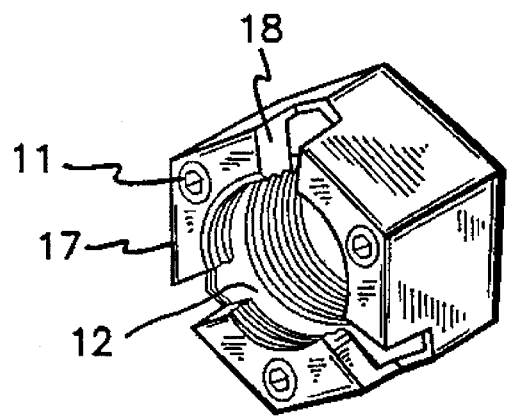
FIG. 7 is an additional preferred embodiment of a locking member according to the present invention designed as a hexagon locknut.

FIG. 7 shows another embodiment of the locking member, here in the form of a hexagon nut, which in the embodiment shown is provided with three sectors 17 and three locking means 11. The member in FIG. 7 furthermore has the primary recess made in the inner rim surface contrary to the elements shown in the FIGS. 1 and 4. The embodiment shown in FIG. 7 is intended for an external locking is provided with a female thread, whereby the locking means 11 preferably are designed as pulling bolts similar to the embodiment of FIG. 4.

In an additional embodiment (FIG. 8) of the locking member corresponding to FIG. 4 for internal locking the primary recess is arranged at the inner rim surface in the same manner as in FIG. 7, whereby the locking means preferably are constituted by pushing bolts equivalent to the design of FIG. 1. A locking member for internal locking having the primary recess arranged at the inner rim surface consequently does not need any raised collar arranged underneath the head of the bolt. At the same time the member will hereby present a continuous face towards the internal surface where the locking will take place.

Figure 8:
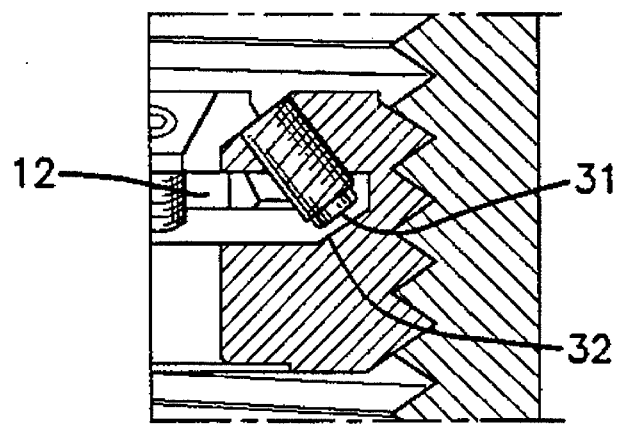
FIG. 8 is demonstrating an alternative embodiment of the locking device according to the present invention.
Figure 9:
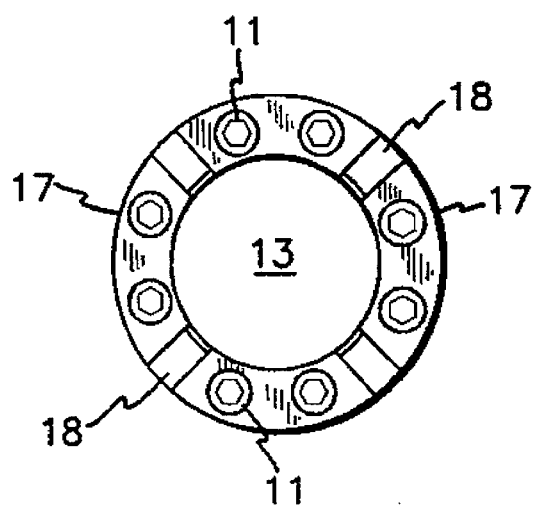
FIG. 9 is a horizontal top view of an alternative embodiment depicting a locking member wherein each segment comprises more than one locking means.

Finally, FIG. 8 shows in section a preferred embodiment having the locking means as an inclined pushing bolt, whereby the member for internal locking is arranged having the primary recess 12 at its inner rim surface. As may be seen from FIG. 8 the shoulder surface 32 in the primary recess 12 is arranged having a small angle of the order of 3°–5° to the end surface 31 of the bolt. In a corresponding manner in the preferred embodiment of FIG. 1 the inner side surface is inclined towards the second supporting portion 14 of the recess constituting the shoulder surface within the primary recess 12 against the straight inward directed locking means 11 to enhance the shearing force for the clamping of the locking member, also facilitating that it will be possible to decrease the dimension of the bolt constituting the locking means.

The locking member according to the present invention offers a simple but very precise locking at the same time as the member in production is very economical and may automatically be produced in large series at low costs. The present invention has been described by means of preferred embodiments but may be changed and modified in a numerous ways by a person skilled in the technique without departing from the scope of the invention.

We claim:

1. A locking member for one of internal and external locking surfaces with one of threaded and non-threaded surfaces, comprising a first and a second side face, an outer rim surface, a through hole (13) forming an inner rim surface, locking means (11) in a form of bolts in the first side face and a primary recess (12) running in one of said inner and outer rim surface, the first side face being sectionalized by radial cuts extending to said primary recess to form sectors which are essentially independent stiff resilient segments, each segment being provided with a locking means, said primary recess (12) and said first and second side faces together forming a first inner surface and a second inner surface which is substantially parallel to said first inner surface and which divides said member into a solid second supporting portion (14) with said second side face and a thinner first portion (16) with said first side face having symmetrically arranged locking means (11) at said first side face, said locking means being threaded into the thinner first portion (16) and having a second end resting against said second inner surface closest to said solid second supporting portion (14) presenting thereby a pushing function against said solid supporting portion (14), the depth of said primary recess (12) being slightly less than the thickness of material between the outer rim surface and the inner rim surface such that said locking member is formed as an integrated piece.

2. The locking member according to claim 1 wherein one of said inner and outer rim surface is one of circular and symmetrically polygonal.

3. The locking member according to claim 2, wherein said through hole (13) has a circular shape and is provided with a female thread, to be able to be locked onto an externally threaded element.

4. The locking member according to claim 2, wherein said outer rim surface is circular and provided with a male thread, to be able to be locked into an internally threaded element.

5. The locking member according to claim 2, wherein said locking means are positioned symmetrically at each formed sector into holes through each sector (17), the locking means (11) in each sector being perpendicular to said second inner surface of the primary recess (12) and to the solid second supporting portion (14) of the locking member.

6. The locking member according to claim 2, wherein said first side face comprises an inclined portion into which the locking means extends and that in each sector locking means is arranged perpendicular to said inclined portion of said first side face of said thinner first portion (16) and inclined towards the second inner surface of the primary recess (12) at the solid second supporting portion (14).

7. The locking member according to claim 6, wherein there is arranged an inclined shoulder surface (32) at the second inner surface in said primary recess (12) towards the solid second supporting portion (14) preferably having a corresponding small inclination to an end surface of an inclined second end (31) of the locking means (11).

8. The locking member according to claim 1 wherein each segment comprises more that one locking means.

9. A locking member for one of internal and external locking surfaces with one of threaded and non-threaded surfaces, comprising a first and a second side face, an outer rim surface, a through hole (13) forming an inner rim surface, locking means (11) in a form of bolts in the first side face and a primary recess (12) running in one of said inner and outer rim surface and the first side face being sectionalized by radial cuts which extend to said primary recess to form sectors which are essentially independent stiff resilient segments, each segment being provided with a locking means, said primary recess (12) and said first and second side faces together forming a first inner surface and a second inner surface which is substantially parallel to said first inner surface and which divides said member into a solid second supporting portion (14) with said second side face and a thinner first portion (16) with said first side face having symmetrically arranged locking means (11) at said first side face, said locking means being threaded into the solid second supporting portion (14) while one of a first end and a head is resting against a raised collar (22) at an outer or inner edge of said first side face of said thinner first portion (16), presenting thereby a pulling function towards said solid second supporting portion (14), the depth of said primary recess (12) being slightly less than the thickness of material between the outer rim surface and the inner rim surface such that said locking member is formed as an integrated piece.

10. The locking member according to claim 9, wherein one of said inner and outer rim surface is one of circular and symmetrically polygonal.

11. The locking member according to claim 10, characterized in that said through hole (13) has a circular shape and is provided with a female thread, to be able to be locked onto an externally threaded element.

12. The locking member according to claim 10, characterized in that said outer rim surface is circular and provided with a male thread, to be able to be locked into an internally threaded element.

13. The locking member according to claim 10, wherein said locking means are positioned symmetrically at each formed sector into holes through each sector (17), the locking means (11) in each sector present being perpendicular to said second inner surface of the primary recess (12) and to the solid second supporting portion (14) of the member.

14. The locking member according to claim 10, wherein said first side face comprises an inclined portion into which the locking means extends and that in each sector, locking means is arranged perpendicular to said inclined portion of said first side face of said thinner first portion (16) and inclined towards the second inner surface of the primary recess (12) at the solid second supporting portion (14).

15. The locking member according to claim 14, wherein there is arranged an inclined shoulder surface (32) at the second inner surface in said primary recess (12) towards the solid second supporting portion (14) preferably having a corresponding small inclination to an end surface of an inclined second end (31) of the locking means (11).

\* \* \* \* \*